United States Patent
Wang et al.

(10) Patent No.: US 8,122,481 B2
(45) Date of Patent: Feb. 21, 2012

(54) SYSTEM AND METHOD FOR PERMISSION MANAGEMENT

(75) Inventors: Rui Wang, Shenzhen (CN); Yongsheng Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 904 days.

(21) Appl. No.: 11/837,139

(22) Filed: Aug. 10, 2007

(65) Prior Publication Data

US 2008/0040774 A1    Feb. 14, 2008

(30) Foreign Application Priority Data

Aug. 11, 2006  (CN) .......................... 2006 1 0115237

(51) Int. Cl.
*G06F 17/00* (2006.01)

(52) U.S. Cl. .............................................. 726/1; 726/27

(58) Field of Classification Search ................. 726/1, 27
See application file for complete search history.

(56) References Cited

U.S. PATENT DOCUMENTS

| 5,493,692 | A | 2/1996 | Theimer et al. |
| 7,013,391 | B2 * | 3/2006 | Herle et al. ................ 713/182 |
| 7,225,460 | B2 * | 5/2007 | Barzilai et al. ................ 726/1 |
| 7,503,074 | B2 * | 3/2009 | Dublish et al. ................ 726/27 |
| 7,853,786 | B1 * | 12/2010 | Fultz et al. ................ 713/166 |
| 2002/0104015 | A1 | 8/2002 | Barzilai et al. |
| 2003/0074456 | A1 | 4/2003 | Yeung et al. |
| 2003/0101341 | A1 | 5/2003 | Kettler, III et al. |
| 2004/0236694 | A1 | 11/2004 | Tattan et al. |
| 2005/0044423 | A1 | 2/2005 | Mellmer et al. |
| 2005/0213519 | A1 | 9/2005 | Relan et al. |

FOREIGN PATENT DOCUMENTS

| CN | 1592211 A | 9/2005 |
| CN | 1747386 A | 3/2006 |
| CN | 1787528 A | 6/2006 |
| WO | WO2005/120027 | 12/2005 |

OTHER PUBLICATIONS $2^{nd}$ Office Action in corresponding European Application No. 07721462.5 (Feb. 28, 2011).
$1^{st}$ Office Action in corresponding Chinese Application No. 200780000187.3 (Feb. 1, 2011).
"Global Permissions Management Requirements," Apr. 5, 2006, Draft Version 1.0, Open Mobile Alliance, San Diego, California.

* cited by examiner

*Primary Examiner* — Kambiz Zand
*Assistant Examiner* — Amare F Tabor
(74) *Attorney, Agent, or Firm* — Leydig, Voit & Mayer, Ltd.

(57) ABSTRACT

The present invention discloses a system and a method for permission management, and a permission management server. The system includes: a privacy owner terminal, for providing a privacy owner's privacy; a privacy management system, for obtaining the privacy owner's privacy provided by the privacy owner terminal; a privacy inquiry terminal, for inquiring about the privacy owner's privacy from the privacy management system and further obtaining an privacy inquirer's privacy provided by the privacy management system; a permission management server, for determining whether to grant a privacy inquirer to obtain the privacy owner's privacy according to a predetermined privacy permission rule when the privacy inquirer inquires about the privacy owner's privacy via the privacy inquiry terminal.

9 Claims, 4 Drawing Sheets

SYSTEM AND METHOD FOR PERMISSION MANAGEMENT

CROSS-REFERENCE TO RELATED APPLICATIONS

This application claims the benefit of CN Application No. 200610115237.X filed on Aug. 11, 2006, titled "SYSTEM AND METHOD FOR PERMISSION MANAGEMENT, AND PERMISSION MANAGEMENT SERVER", which is incorporated herein by reference in its entirety.

FIELD OF THE INVENTION

The present invention relates to the field of mobile communications, and in particular, to a system and a method for permission management, and a permission management server.

BACKGROUND OF THE INVENTION

With the continuous development of the communication technologies, mobile communication service providers provide abundant value-added services such as Location Service and Presence Service, etc. By means of the Location Service, a Location Service system may provide location information of a certain user to the user herself/himself or to other users who request the user's location. For example, when a user, who does not even know his or her own current location, wants to know the location of the nearest restaurant, the user may call a service center so long as his or her mobile registers a related service Location Service. The mobile communication network will initiate the Location Service system to obtain the specific location of the user and send the location information to the service center together with voice information of the user. After the service center receives the call, it may inform the user of an address of the nearest restaurant according to the obtained location information. At present, the Location Service boasts an outstanding function in the fields of emergency aid, vehicle navigation and intelligent traffic, job scheduling and team management, etc. In the Presence Service, states of other users in contact with a certain user, such as Power-On/Power-Off information, online information, location, mood and so on, may be delivered to the user via an Email or a short message, etc.

During the implementation of the invention, the inventor finds, by research, that value-added services such as the above Location Service and Presence Service, etc. may provide security safeguards, and individualized and customized services for a service user, by providing location information, state information and so on of a user who registers services to other users. For a user, the user wants to protect himself/herself privacy while the satisfactory security safeguards and individualized services are obtained; however, the privacy of the user who registers services cannot be protected because his or her information is usually sent to users besides the user who desire to obtain the user information.

Therefore, a need exits for an improved system and method to provide better protection of the user's privacy which overcomes the problems stated above.

SUMMARY OF THE INVENTION

Embodiments of the invention provide a system and a method for permission management, and a permission management server, to effectively protect the privacy information of a service user.

An embodiment of the invention provides a system for permission management, including: a privacy owner terminal, for providing a privacy owner's privacy; a privacy management system, for obtaining the privacy owner's privacy provided by the privacy owner terminal; a privacy inquiry terminal, for inquiring about the privacy owner's privacy from the privacy management system; and a permission management server, for determining whether to grant a privacy inquirer to obtain the privacy owner's privacy according to a predetermined privacy permission rule when the privacy inquirer inquires about the privacy owner's privacy via the privacy inquiry terminal. When a result of whether to grant the privacy inquirer to obtain the privacy means "Grant", the result is sent to the privacy management system; when the result sent by the permission management server means "Grant", the privacy management system provides the privacy owner's privacy to the privacy inquiry terminal.

An embodiment of the invention provides a method for permission management, including: saving a privacy permission rule for a privacy owner; identifying information contained in a privacy inquiry request; and determining whether to grant to release privacy information of the privacy owner according to the identified information and the privacy permission rule.

An embodiment of the invention provides another system for permission management, including: a permission rule storage unit, for saving a privacy permission rule of a privacy owner; an information identifying unit, for identifying information contained in a privacy inquiry request and providing the identified information to a permission inquiry unit; and the permission inquiry unit, for obtaining a result of whether to grant the privacy inquirer to obtain privacy according to the information provided by the information identifying unit and the privacy permission rule saved by the permission rule storage unit.

In the embodiments of the invention, by a privacy permission rule set for a privacy owner, it may be determined whether a privacy inquirer is granted to obtain a privacy owner's privacy according to the privacy rule when the privacy inquirer inquires about the privacy owner's privacy. The privacy owner's privacy can be provided to the privacy inquirer only when the privacy inquirer is granted. Other inquirers who are not granted cannot obtain the information. Therefore, a privacy owner's privacy may be protected effectively.

DETAILED DESCRIPTION OF THE EMBODIMENTS

Embodiments of the invention provide a basic conception for solving the above disadvantages. In other words, a privacy permission rule is set for a service user to manage to which users the service user's privacy can be granted to release. Thus, the service user's privacy is effectively protected.

In the embodiments of the invention, "privacy" mainly refers to a target attribute of a user, which includes information such as identity, Location information, Presence information, other individual data, and data defined by an application (clock, date information and so on), preferred device and capacity, etc.

The privacy permission rule includes the following contents, as shown in the following table:

| Privacy Owner | Privacy Type | Contact | Privacy Inquirer |
| --- | --- | --- | --- |

In the table, Privacy Owner, i.e., a service user who registers the above Location Service, Presence Service and so on, may be indicated by a user name or contact.

Privacy Type refers to types of privacy to be protected by the privacy owner, such as location information, Power-On/Power-Off information and so on. Each privacy owner may have a plurality of different privacy types.

Privacy Inquirer, i.e. a user to whom a certain type of privacy is granted to release, may be indicated by a user name or Contact thereof or by an ID of a certain web site.

Each privacy type of a privacy owner has a corresponding contact, which may be phone number, Email and so on. Because the contact may be saved in a permission management server together with a user name, user ID and so on, the contact is optional in the privacy permission rule.

Figure 1:
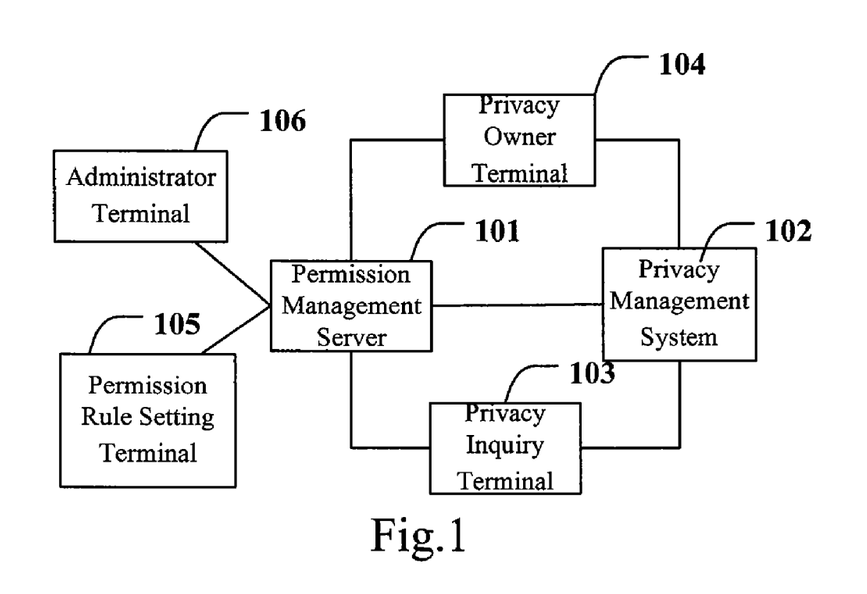
FIG. 1 is a structural diagram of components of a system for permission management of an embodiment of the invention.

The technical solutions for the embodiments of the invention are here described in detail. Referring to FIG. 1, a system for permission management according to an embodiment of the invention includes the following units:

Permission management server 101, for obtaining a result of whether to grant a privacy inquirer to obtain a certain type of a privacy owner's privacy according to a predetermined privacy permission rule when the privacy inquirer inquires about the privacy owner's privacy, and providing the result to privacy management system 102 when the result means "Grant".

Permission management server 101, for identifying a privacy inquiry request to obtain privacy type information, privacy inquirer information and privacy owner information when receiving a permission checking request sent by privacy management system 102 or intercepting a privacy content inquiry request which is sent from privacy inquiry terminal 103 to privacy management system 102, and obtaining the result of whether the privacy inquirer to grant the privacy inquirer to obtain the type of the privacy owner's privacy according to the predetermined privacy permission rule.

Permission management server 101 is further used for further providing the result to privacy management system 102 or directly notifying privacy inquiry terminal 103 that the request for inquiring about privacy fails when the result means "Deny".

Privacy management system 102, for obtaining the privacy owner's privacy from privacy owner terminal 104, and sending it to privacy inquiry terminal 103 when the result provided by permission management server 101 means "Grant".

Privacy management system 102 is further used for inquiring about the result of whether to grant the privacy inquirer to obtain the privacy from permission management server 101 when privacy inquiry terminal 103 inquires about the privacy owner's privacy from privacy management system 102.

In addition, privacy management system 102, for notifying privacy inquiry terminal 103 that the request for inquiring about privacy fails when the result provided by permission management server 101 means "Deny".

Privacy management system 102 may be a Location Service system, a Presence Service system, or a system relating to other privacy services, etc.

Privacy inquiry terminal 103, for sending the privacy content inquiry request to privacy management system 102, and further receiving the inquired privacy owner's privacy provided by privacy management system 102 when being granted to obtain the inquired privacy.

Privacy inquiry terminal 103 is further used for receiving a privacy inquiry request failure notification returned by permission management server 101 or privacy management system 102 when being denied to obtain the inquired privacy.

Privacy owner terminal 104, for providing the privacy owner's privacy to privacy management system 102.

The system further includes the following units:

Permission rule setting terminal 105, for setting a privacy permission rule of the privacy owner on permission management server 101. Permission management server 101 is further used for notifying privacy owner terminal 104 of the set privacy permission rule.

Administrator terminal 106, for setting a right for a permission rule establisher on permission management server 101. Permission management server 101 is further used for saving right information set for the permission rule establisher by an administrator, and notifying permission rule establisher terminal 105 of the right information.

Figure 2:
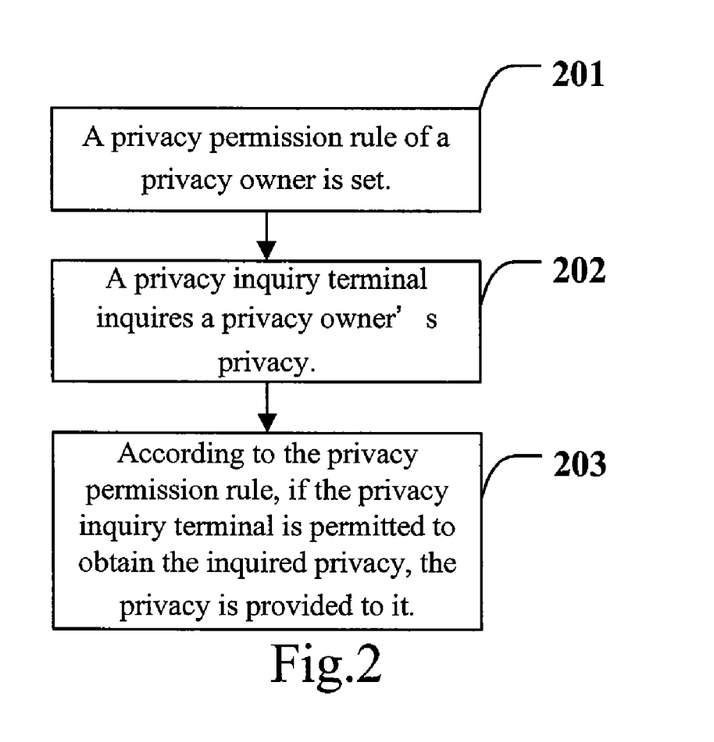
FIG. 2 is a flow chart of a method for permission management of an embodiment of the invention.

FIG. 2 is a flow chart of a method for permission management according to an embodiment of the invention, which includes:

Block 201: setting a privacy permission rule of a privacy owner.

Block 202: inquiring, by a privacy inquiry terminal, about a privacy owner's privacy.

Block 203: providing the privacy, by a privacy management system, to the privacy inquiry terminal which is granted to obtain the inquired privacy according to the privacy permission rule.

Figure 3:
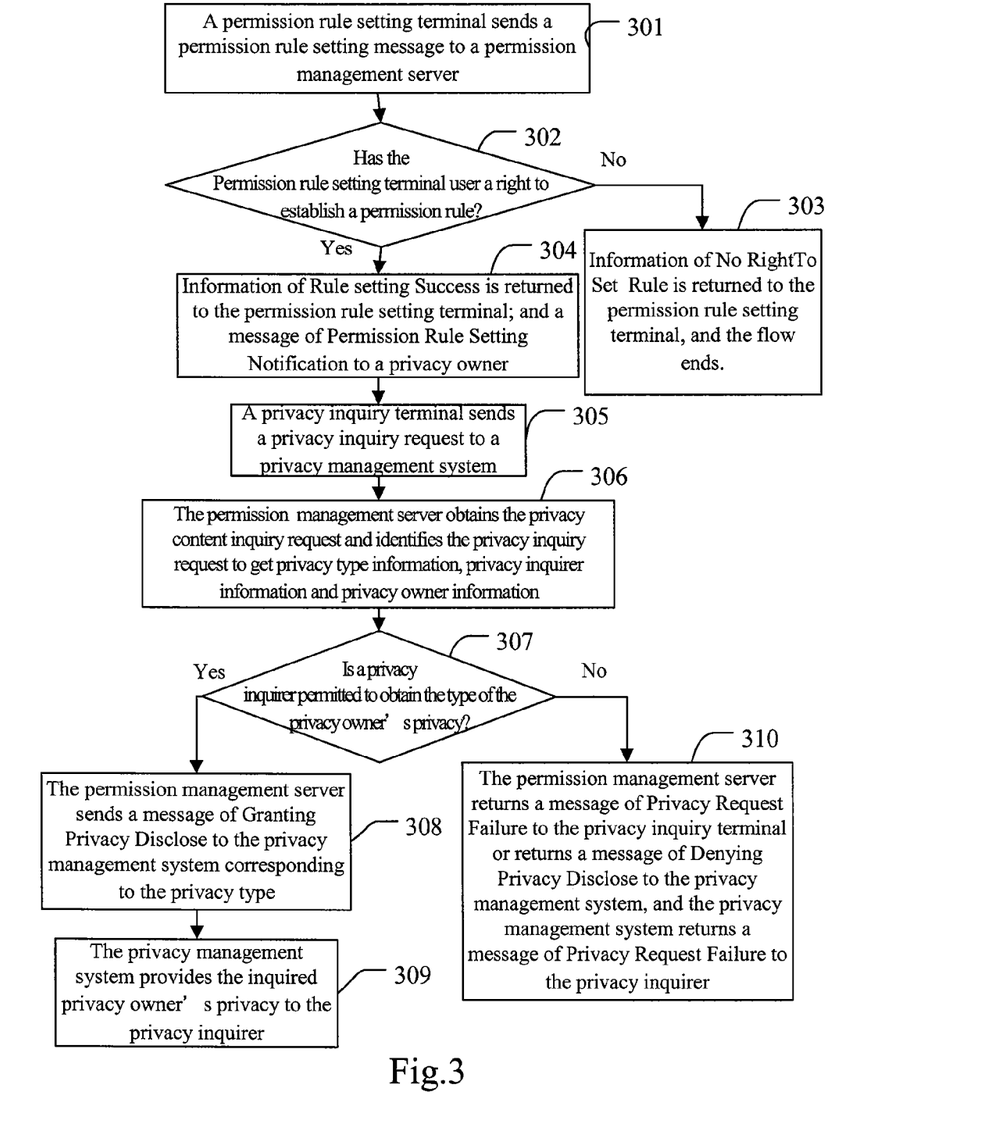
FIG. 3 is a flow chart of method 1 for permission management of an embodiment of the invention.

A method for permission management according to an embodiment of the invention is now described in conjunction with FIG. 3. In the embodiment, a privacy inquirer sends a privacy content inquiry request to a privacy management system, and a permission management server intercepts the request, identifies information of service type, privacy inquirer and privacy owner, and obtains privacy type information according to the service type information. Next, the permission management server determines whether to grant the privacy inquirer to obtain a privacy owner's privacy of the type according to a privacy permission rule, and provides the result of whether to grant the privacy inquirer to get the privacy to the privacy management system. The method specifically includes the following processes.

Block 301: A permission rule setting terminal sends a permission rule setting message, which contains right confirmation information and the privacy permission rule, to the permission management server.

The permission rule setting terminal may have the following two kinds of right confirmation information, i.e. identity information of a permission rule establisher, including a user name and a password; and a user ID randomly assigned to the permission rule establisher by the permission management server after the permission rule setting terminal logs in to the permission management server by the user name and the password before setting the permission rule on the permission management server.

The privacy permission rule includes the privacy owner information, privacy type information and privacy inquirer information. The privacy owner information may be a user name or a privacy owner's contact. The privacy permission rule may be a set of rules corresponding to one privacy owner, or multiple sets of rules corresponding to a plurality of privacy owners.

Block 302: The permission management server determines whether a terminal user for setting permission rule has a right to set the permission rule according to the right confirmation information. If yes, the process proceeds to Block 304; otherwise, the process proceeds to Block 303.

Block 303: The permission management server returns information of No Right To Set Rule to the permission rule setting terminal, and the process ends.

Block 304: The permission management server saves the privacy permission rule, returns information of Rule Setting Success to the permission rule setting terminal, and sends a message of Permission Rule Setting Notification, which includes the privacy type information and privacy inquirer information, to the privacy owner by the privacy owner's contact, for notifying the privacy owner that the privacy type of the privacy is granted to release to the privacy inquirer.

The privacy owner may provide his/her contact to the permission management server by logging in the server. If the privacy owner is represented by his or her contact when the permission rule setting terminal sends the permission rule setting message to the permission management server, an authorization server has the privacy owner's contact. Therefore, the privacy owner may not log in to the permission management server.

Block 305: A privacy inquiry terminal sends the privacy content inquiry request, which contains the privacy inquirer information, the service type information and the privacy owner information, to the privacy management system.

Block 306: The permission management server intercepts the privacy content inquiry request and identifies the privacy content inquiry request to get the privacy type information, the privacy inquirer information and the privacy owner information.

Because the privacy content inquiry request sent by the privacy inquiry terminal includes the service type information, and a service type corresponds to a privacy type, the inquired privacy type information may be obtained from the service type information when the permission management server identifies the privacy content inquiry request.

Block 307: If the privacy inquirer is granted to obtain the type of the privacy owner's privacy according to the privacy permission rule, the process proceeds to Block 308; otherwise, the process proceeds to Block 310.

The determining whether the privacy inquirer is granted to obtain the type of the privacy owner's privacy is implemented in the following processes.

The privacy owner that is the same as or corresponding to the privacy owner information in the request is searched by the privacy permission rule.

A privacy type that is the same as the privacy type in the request is searched in the permission rule of the privacy owner.

Information that is the same as the privacy inquirer information in the request is searched based on the privacy type. If the privacy inquirer information is recorded based on the privacy type, the privacy inquirer is granted to obtain the type of the privacy owner's privacy; otherwise, the privacy inquirer is not granted.

Block 308: The permission management server sends a message of Granting Privacy Release, which includes the privacy inquirer information and the privacy owner information, to the privacy management system corresponding to the privacy type.

Block 309: The privacy management system provides the inquired privacy owner's privacy to the privacy inquirer, and the process ends.

Block 310: The permission management server returns a message of Privacy Request Failure to the privacy inquiry terminal, or the permission management server returns a message of Denying Privacy Release to the privacy management system, and the privacy management system returns the message of Privacy Request Failure to the privacy inquirer, wherein the message of Privacy Request Failure may include the privacy owner information and the privacy type, and further include the reason of request failure.

Figure 4:
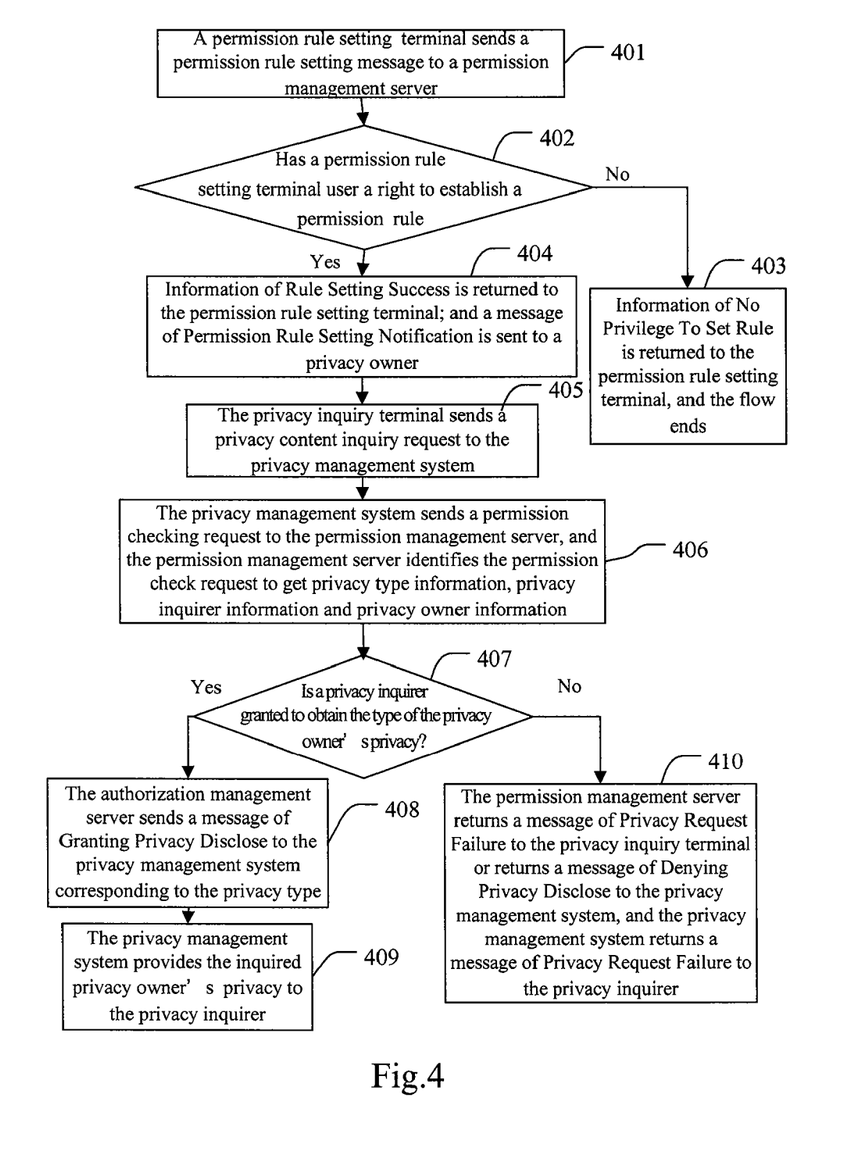
FIG. 4 is a flow chart of method 2 for permission management of an embodiment of the invention.

In an embodiment of the invention, a privacy inquirer sends a privacy content inquiry request to a privacy management system, the privacy management system sends a permission checking request to the permission management and permission management server identifies the permission checking request to get privacy type information, privacy inquirer information and privacy owner information. Then, the permission management server determines whether the privacy inquirer is granted to obtain the type of the privacy owner's privacy according to a privacy permission rule, and provides the result to the privacy management system. With reference to FIG. 4, the embodiment specifically includes the following processes.

Block 401: A permission rule setting terminal sends a permission rule setting message, which contains right confirmation information and the privacy permission rule, to the permission management server.

A permission rule establisher may have the following two kinds of right confirmation information, i.e. identity information of the permission rule establisher, including a user name and a password; and a user ID randomly assigned to the permission rule establisher by the permission management server after the permission rule setting terminal logs in to the permission management server by the user name and the password before setting the permission rule on the permission management server.

The privacy permission rule contains the privacy owner information, the privacy type information and the privacy inquirer information, wherein the privacy owner information may be a user name or a contact of a privacy owner.

Block 402: The permission management server determines whether a terminal user for setting permission rule has a right to set the permission rule according to the right confirmation information. If yes, the process proceeds to Block 404; otherwise, the process proceeds to Block 403.

Block 403: The permission management server returns information of No Right To Set Rule to the permission rule setting terminal, and the process ends.

Block 404: The permission management server saves the privacy permission rule, returns information of Rule Setting Success to the permission rule setting terminal, and sends a message of Permission Rule Setting Notification, which includes the privacy type information and the privacy inquirer information, to the privacy owner by the privacy owner's contact, for notifying the privacy owner that the privacy type of the privacy is granted to release to the privacy inquirer.

The privacy owner may provide his/her contact to the permission management server by logging in the server. If the privacy owner is represented by his or her contact when the permission rule setting terminal sends the permission rule setting message to the permission management server, an authorization server has the privacy owner's contact. Therefore, the privacy owner may not log in to the permission management server.

Block 405: The privacy inquiry terminal sends a privacy content inquiry request, which contains the privacy inquirer information and the privacy owner information, to the privacy management system.

Block 406: The privacy management system sends a permission checking request, which includes the privacy inquirer information, the privacy type information and the privacy owner information, to the permission management server. The permission management server identifies the permission checking request to get the above information.

Block 407: If the privacy inquirer is granted to obtain the type of the privacy owner's privacy according to the privacy permission rule, the process proceeds to Block 408; otherwise, the process proceeds to Block 410.

The determining whether the privacy inquirer is granted to obtain the type of the privacy owner's privacy is implemented in the following processes.

The privacy owner that is the same as or corresponding to the privacy owner information in the request is searched in the privacy permission rule.

The privacy type that is the same as the privacy type in the request is searched in the permission rule of the privacy owner.

Information that is the same as the privacy inquirer information in the request is searched based on the privacy type. If the privacy inquirer information is recorded based on the privacy type, the privacy inquirer is granted to obtain the type of the privacy owner's privacy; otherwise, the privacy inquirer is not granted.

Block 408: The permission management server sends a message of Granting Privacy Release which contains the privacy inquirer information and the privacy owner information, to the privacy management system corresponding to the privacy type.

Block 409: The privacy management system provides the inquired privacy owner's privacy to the privacy inquirer, and the process ends.

Block 410: The permission management server returns a message of Privacy Request Failure to the privacy inquiry terminal or the permission management server returns a message of Denying Privacy Release to the privacy management system, and the privacy management system returns the message of Privacy Request Failure to the privacy inquirer, wherein the message of Privacy Request Failure may contain the privacy owner information and the privacy type, and further contain the reason of request failure.

Before a permission rule establisher sets a permission rule on a permission management server, the administrator may set a right for the permission rule establisher. The process in which the administrator sets the right for the permission rule establisher will now be described in detail in conjunction with FIG. 5.

Figure 5:
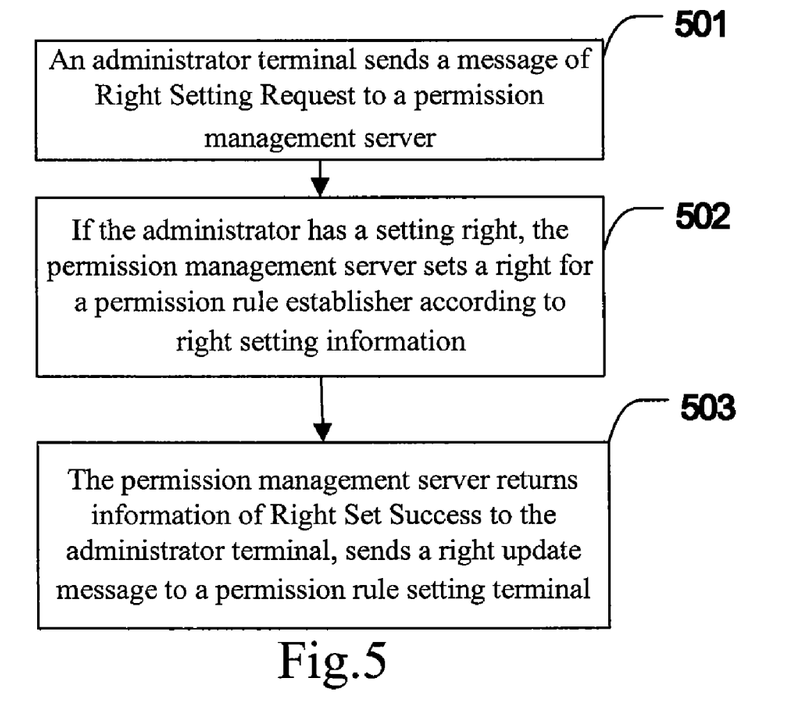
FIG. 5 is a flow chart for setting a right for a permission rule establisher by an administrator of an embodiment of the invention.

Block 501: An administrator terminal sends a message of Right Setting Request, which contains right confirmation information, permission rule establisher information and setting right information, to the permission management server.

The setting right information may be privacy owner information that is added to a management object list of the permission rule establisher or the privacy owner information that is deleted from the management object of the permission rule establisher, or it may further be privacy owner information which is added to the management object list, the privacy type information managed by the administrator terminal, and so on.

The administrator has the following two kinds of right confirmation information, i.e. identity information of the administrator, including a user name and a password; and a user ID randomly assigned to the administrator by the permission management server after the administrator logs in the permission management server by the user name and the password before sending a message of Right Setting Request to the permission management server.

Block 502: If the administrator has a right to set the right for the permission rule establisher according to the right confirmation information, the permission management server sets the right for the permission rule establisher according to the setting right information.

Block 503: The permission management server returns information of Right Setting Success to an administrator terminal, sends a right update message to a permission rule setting terminal, and provides updated right information to the permission rule setting terminal.

In the above embodiment, the functions of the administrator terminal, the permission rule setting terminal and the privacy owner terminal may be integrated in the same terminal. When a user of the terminal logs in the permission management server by a user name and a password, the permission management server may further return right information to the user according to the user name and the password, and the terminal provides a corresponding operation capacity to the user by the right information. If the returned right information indicates that the user of the terminal is an administrator, an application of the administrator will be provided. If the returned right information indicates that the user of the terminal is a permission rule establisher, an application for setting the permission rule will be provided.

Figure 6:
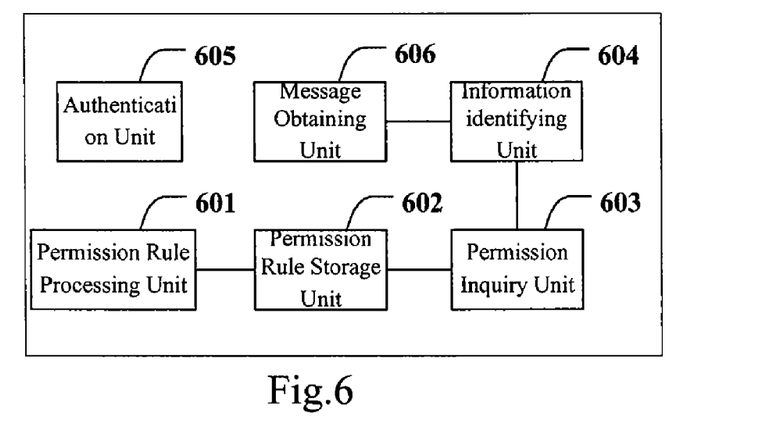
FIG. 6 is a structural diagram of a permission management server of components of an embodiment of the invention.

An embodiment of the invention further provides a permission management server, as shown in FIG. 6, which includes the following units.

Permission rule processing unit 601 is used for authenticating an identity of a permission rule establisher when a permission rule setting message is received, and recording a privacy permission rule in the message in permission rule storage unit 602 when it is determined that the permission rule establisher has a right to set a permission rule.

Permission rule processing unit 601 is further used for authenticating an identity of an administrator when a message of Right Setting Request is received, and updating the right for the permission rule establisher in permission rule storage unit 602 when it is determined that the administrator has a right to set the right for the permission rule establisher.

Right confirmation information may be a user name and a password of a user, or a user ID randomly assigned by authentication unit 605.

Permission rule storage unit 602 is used for saving the privacy permission rule of a privacy owner, and further saving the right information set for the permission rule establisher by the administrator.

Permission inquiry unit 603 is used for providing an permission checking request to information identifying unit 604 when the permission checking request which contains privacy type information, privacy owner information and privacy inquirer information is received, and obtaining a result of whether to grant a privacy inquirer to get a privacy according to the privacy type information, the privacy owner information and the privacy inquirer information provided by information identifying unit 604 and the privacy permission rule saved in permission rule storage unit 602.

Information identifying unit 604 is used for identifying the permission checking request provided by permission inquiry unit 603 to obtain the privacy type information, the privacy owner information and the privacy inquirer information, and returning the identified information to permission inquiry unit 603.

Information identifying unit 604 and permission inquiry unit 603 may be separated physically, or configured together.

Authentication unit 605 is used for saving user information such as login information, user right, etc., and returning the user ID assigned randomly and the right information to a user terminal if the login information provided by a user is consistent with the saved login information when the user logs in, in other words, the identity authentication is passed.

The permission management server further includes the following units.

Message obtaining unit 606, configured to obtain a privacy inquiry request. In the embodiment, the message obtaining unit 606 is a message intercepting unit configured for intercepting a privacy content inquiry request from a privacy inquiry terminal which comprises privacy type information, privacy owner information and privacy inquirer information, and providing the inquiry content request to information identifying unit 604. In one embodiment, the message obtaining unit 606 may be a message receiving unit, configured for receiving a permission checking request which comprises privacy type information, privacy owner information and privacy inquirer information, and providing the permission checking request to the information identifying unit 604.

Information identifying unit 604 is further used for identifying the privacy content inquiry request provided by the message intercepting unit or the permission checking request provided by the message receiving unit to get service type information, the privacy owner information and the privacy inquirer information, obtaining the privacy type information according to a correlation between the privacy type information and the service type information which are saved, and submitting the above privacy type information, privacy owner information and privacy inquirer information to permission inquiry unit 603.

One specific example in which an embodiment of the invention is applied to a team management is shown below, wherein King is an administrator of a company, responsible for setting a right for Alice. Alice is a department manager of the company, responsible for setting a privacy permission rule for Bob, Chris and David who are managed by Alice. Bob, Chris and David are on-site maintenance engineers having wireless terminals with positioning functions. Joe inquires about information of Bob, Chris and David by an application with an ID of CSS.com. The special processes are as follows.

S1: King provides a user name and a password to log in a permission management server.

```
<GPM-CSP-Message
xmlns="http://www.openmobilealliance.org/DTD/GPM1.0">
    <Transaction>
        <!-- :login GPM server -->
        <LoginRequest>
        <!-- :logger information -->
            <UserID>King</UserID>
              <Password>2`8Jh9Z</Password>
              <ClientID>http://211.112.1.1/GPMAPP</ClientID>
        </LoginRequest>
    </Transaction>
</GPM-CSP-Message>
```

S2: The permission management server authenticates King's identity according to the user name and the password to, and confirms that he is an administrator, and returns a login response message to King, which includes a user ID randomly assigned to King.

```
<GPM-CSP-Message
xmlns="http://www.openmobilealliance.org/DTD/GPM1.0">
    <Transaction>
        <!-- :login GPM response message -->
        <LoginResponse>
        <!-- :logger information -->
            <UserID>10001</UserID>        <!-- :ID randomly assigned
by the system, which indicates user information of logger -->
            <RightLevel>0:Administrator</RightLevel>   <!-- :logger right
              information -->
        </LoginResponse>
    </Transaction>
</GPM-CSP-Message>
```

S3: The client terminal of King records the user ID of King after receiving the login response message, and opens an administrator's menu application for King. King sends a message of Right Setting Request to the permission management server for assigning a right to Alice. The message contains a user ID assigned during login, permission rule establisher information, and privacy owner information managed by a permission rule establisher.

```
<GPM-CSP-Message
xmlns="http://www.openmobilealliance.org/DTD/GPM1.0">
    <SenderInfo>
        <!-- :administrator information -->
        <ClientID>http://211.112.1.1/GPMAPP</ClientID>
        <UserID>10001</UserID>        <!-- :user ID assigned by the
        system -->
    </SenderInfo>
    <Transaction>
        <!-- :to set a right for an permission establisher -->
        <RightDefine>
        <!-- :permission establisher information -->
            <ManagerID>Alice</ManagerID>
        <!-- : a privacy owner information managed by the permission
        establisher -->
            <RulesAppend>
                <Rules>     <!-- :Bob's location permission setting right -->
                    <Target>LOC</Target>
                        <UserID>13601119999</UserID>
                </Rules>
                <Rules>     <!-- :Chris's location permission setting right -->
                    <Target>LOC</Target>
                        <UserID>13601118888</UserID>
                </Rules>
                <Rules>     <!-- :David's location permission setting right -->
                    <Target>LOC</Target>
                        <UserID>13601117777</UserID>
                </Rules>
                <Rules>     <!-- :someone's Power-On notification permission
setting right -->
                    <Target>Presence</Target>
                        <UserID>13601234567</UserID>
                </Rules>
            </RulesAppend>
        </RightDefine>
    </Transaction>
</GPM-CSP-Message>
```

The permission management server authenticates King's identity according to the user ID in the message of Right Setting Request. If an administrator's identity is determined, the permission management server learns to set a right for Alice according to the permission rule establisher information in the request message, and adds the added management object to Alice's management object list.

| SN | Object | Permission Type |
|----|--------|-----------------|
| 1 | 13601119999 | LOC |
| 2 | 13601118888 | LOC |
| 3 | 13601117777 | LOC |
| 4 | 13601234567 | Presence |
| 5 | ... | ... |

S5: Alice provides a user name and a password to log in the permission management server.

```
<GPM-CSP-Message
xmlns="http://www.openmobilealliance.org/DTD/GPM1.0">
    <Transaction>
        <!-- :login GPM server -->
        <LoginRequest>
        <!-- :logger information -->
            <UserID>Alice</UserID>
            <Password>3#8bhO&Z </Password>
            <ClientID>http://211.112.10.1/GPMAPP</ClientID>
        </LoginRequest>
    </Transaction>
</GPM-CSP-Message>
```

S6: The permission management server authenticates Alice's identity according to the user name and password, determines Alice as a permission rule establisher, and returns a login response message to Alice, which contains a user ID randomly assigned to Alice.

```
<GPM-CSP-Message
xmlns="http://www.openmobilealliance.org/DTD/GPM1.0">
    <Transaction>
        <!-- :login GPM response message -->
        <LoginResponse>
        <!-- :logger information -->
            <UserID>10010</UserID>       <!-- :ID randomly assigned by
the system, which indicates the logger information -->
            <RightLevel>1:Manager</RightLevel>   <!-- :logger right
            information -->
        </LoginResponse>
    </Transaction>
</GPM-CSP-Message>
```

S7: The permission management server sends the privacy owner information newly added by King to Alice.

```
<GPM-CSP-Message
xmlns="http://www.openmobilealliance.org/DTD/GPM1.0">
    <Transaction>
        <!-- : permission establisher right change notification -->
        <RulesNotify>
        <!-- : privacy owner information that may be managed by the
permission establisher -->
            <RulesAppend>
                <Rules>
                    <Contributor>King</Contributor>   <!-- :user who sets
                    the right -->
                    <Target>LOC</Target>
                    <UserID>13601119999</UserID>
                </Rules>
                <Rules>
                    <Contributor>King</Contributor>
                    <Target>LOC</Target>
                    <UserID>13601118888</UserID>
                </Rules>
                <Rules>
                    <Contributor>King</Contributor>
                    <Target>LOC</Target>
                    <UserID>13601117777</UserID>
                </Rules>
                <Rules>
                    <Contributor>King</Contributor>
                    <Target>Presence</Target>
                    <UserID>13601234567</UserID>
                </Rules>
            </RulesAppend>
        </RulesNotify>
    </Transaction>
</GPM-CSP-Message>
```

S8: The client terminal of Alice records her user ID after receiving the login response message, and opens a menu and an application of the permission rule establisher for Alice. Alice sets a permission rule for her management object and sends it to the permission management server.

```
<GPM-CSP-Message
xmlns="http://www.openmobilealliance.org/DTD/GPM1.0">
    <SenderInfo>
        <!-- :permission rule establisher information -->
        <ClientID>http://211.112.10.1/GPMAPP</ClientID>
        <UserID>10010</UserID>       <!-- :user ID assigned by the
        system -->
    </SenderInfo>
    <Transaction>
        <!-- :to set a permission rule -->
        <PermissionDefine>
        <!-- :content of the permission rule -->
            <PermissionContent>
                <PermissionRequestor>CSS.com</PermissionRequestor>
<!-- :to inquire the service of the permission rule -->
                <Target>LOC</Target>   <!-- :service applied by the
                permission rule -->
        <!-- : added privacy owner information -->
                <UserAppend>
                    <UserID>13601119999</UserID>
                    <UserID>13601118888</UserID>
                    <UserID>13601117777</UserID>
                </UserAppend>
            </PermissionContent>
            <PermissionContent>
                <PermissionRequestor>13645870125</PermissionRequestor>
<!-- :to inquire the service of the permission rule -->
                <Target>Presence</Target>   <!-- :service applied by the
permission rule -->
        <!-- : added privacy owner information -->
                <UserAppend>
                    <UserID>13601234567</UserID>
                </UserAppend>
            </PermissionContent>
        </PermissionDefine>
    </Transaction>
</GPM-CSP-Message>
```

S9: After the permission management server receives the message, the above information is recorded in tables of the respective permission rule of Bob, Chris and David. Take Bob as an example:

```
            13601119999
            CSS.com (Client Service System)
            LOC   ON
```

S10: The permission management server notifies the user of the added permission rule. Because a user's phone number is saved in the server, the user may be notified by a short message.

```
            GPM Server
            Hello, your location information have been
            authorized to CSS.com by Alice at 8:37
            7/3/06
```

S11: Joe receives an on-site maintenance notification, opens Client Service System (CSS) and clicks the button "Location Inquiry". The CSS software inquires about location information of Bob, Chris and David in a location server.

S12: After the location server receives an inquiry message from the Client Service System, it inquires about the permission rule from the permission management server and sends a rule inquiry message.

```
<GPM-CSP-Message
    xmlns="http://www.openmobilealliance.org/DTD/GPM1.0">
    <SenderInfo>
        <!-- :privacy management system information -->
        <ClientID>http://210.102.1.1/GPMAPP</ClientID>
        <Target>LOC</Target>       <!-- :privacy management
        system type -->
    </SenderInfo>
    <Transaction>
        <!-- :to inquire the permission rule -->
        <RightRequest>
        <!-- :inquirer information -->
            <RequestorInfo>CSS.com</RequestorInfo>
            <UserID>13601119999</UserID>
        </RightRequest>
    </Transaction>
</GPM-CSP-Message>
```

S13: After the permission management server receives the message, it inquires about a permission rule of 13601119999, LOC of CSS.com, and returns permission information when finding it is granted to inquire about the LOC of CSS.com.

S14: The location server provides the location information of Bob, Chris and David to the Client Service System.

S15: The Client Service System displays the location information of Bob, Chris and David.

S16: Joe selects an employee who is nearest to the location designated in the notification, and assigns a task to the employee.

In the embodiments of the invention, by setting a privacy permission rule for a privacy owner, it may be determined whether a privacy inquirer is granted to obtain a privacy owner's privacy according to the privacy rule when the privacy inquirer inquires about the privacy owner's privacy. The privacy owner's privacy can be provided to the privacy inquirer only when the privacy inquirer is granted. Other inquirers that are not granted cannot obtain the information. Therefore, the privacy owner's privacy may be protected effectively.

A system and a method for permission management, and a permission management server according to the invention are introduced in details. In the text, the principle and embodiments according to the invention are described by specific examples. The above descriptions of embodiments are just used for helpfully understanding the method and key thought of the invention. For those skilled in the art, various modifications and variations may be made without departing from the spirit or scope of the invention as defined by the appended claims and their equivalents. Therefore, it should be understood that the invention is not limited by the content of description.

What is claimed is:

1. A method for permission management, comprising:
saving, by a permission management server, a privacy permission rule for a privacy owner;
intercepting, by the permission management server, a privacy content inquiry request sent from a privacy inquiry terminal; and
identifying, by the permission management server, the privacy content inquiry request to obtain privacy inquirer information, privacy type information and privacy owner information; and
sending, by the permission management server, a message of Granting Privacy Release to a privacy management system corresponding to a privacy type if a privacy inquirer is granted to obtain an inquired privacy according to the privacy permission rule;
receiving, by the permission management server, a permission rule setting message of the privacy permission rule from a permission rule establisher; and
determining, by the permission management server, whether the permission rule establisher has a right to set the rule;
wherein saving, by a permission management server, the privacy permission rule for a privacy owner further comprises saving the privacy permission rule if the permission rule establisher has a right to set the rule.

2. The method for permission management of claim 1, wherein the privacy owner information is a user name or a contact.

3. The method for permission management of claim 1, wherein after saving the privacy permission rule if the permission rule establisher has the right to set the rule, further comprising:
sending the privacy rule set for a privacy owner to the privacy owner terminal.

4. The method for permission management of claim 1, wherein the right for a permission rule establisher is set according to an administrator terminal.

5. The method for permission management according to claim 4, wherein a permission management server receives a message of Right Setting Request which contains permission rule establisher information and setting right information from the administrator terminal; and sets the right for the permission rule establisher according to the setting right information if the administrator has a right to set the right for the permission rule establisher.

6. The method for permission management of claim 5, wherein, after setting the right for the permission rule establisher, the permission management server sends a right update notification to the permission rule setting terminal.

7. A server for permission management, comprising:
a permission rule storage unit, adapted to save a privacy permission rule of a privacy owner;
a message intercepting unit, adapted to intercept a privacy content inquiry request sent from a privacy inquiry terminal and provide the privacy content inquiry request to an information identifying unit;

the information identifying unit, adapted to identify information contained in a privacy inquiry provided by the message intercepting unit to get service type information, the privacy owner information and the privacy inquirer information, wherein the privacy inquiry is the privacy content inquiry request, obtain the privacy type information according to a saved relation between the service type information and the privacy type information, and send the privacy type information, the privacy owner information and the privacy inquirer information to the permission inquiry unit;

a permission inquiry unit, adapted to obtain a result of whether to grant a privacy inquirer to get a privacy according to the identified information provided by the information identifying unit and the privacy permission rule saved by the permission rule storage unit;

a unit, adapted to send to a privacy management system the result of permission of privacy;

a permission rule processing unit, for receiving a permission rule setting message from a permission rule establisher, and recording the privacy permission rule in the message in the permission rule storage unit when the permission rule establisher has a right to set a rule;

the permission rule processing unit is further configured for receiving a message of Right Setting Request from an administrator, and updating the right for the permission rule establisher in the permission rule storage unit when the administrator has a right to set the right for the permission rule establisher; and the permission rule storage unit is further configured for saving the right information set for the permission rule establisher by the administrator.

8. The server of claim 7, further comprising a message receiving unit, configured for receiving a permission checking request which comprises privacy type information, privacy owner information and privacy inquirer information, and providing the permission checking request to the information identifying unit, wherein the privacy inquiry request is the permission checking request.

9. The server of claim 7, further comprising an authentication unit, for returning a user ID which confirms a user's right to a user when information provided by the user during login is consistent with saved login information.

* * * * *